US008438806B2

(12) United States Patent
Lim

(10) Patent No.: US 8,438,806 B2
(45) Date of Patent: May 14, 2013

(54) COMPOSITE CEMENT PANEL

(76) Inventor: Jee Keng James Lim, Singapore (SG)

( * ) Notice: Subject to any disclaimer, the term of this patent is extended or adjusted under 35 U.S.C. 154(b) by 165 days.

(21) Appl. No.: 12/600,635

(22) PCT Filed: May 9, 2008

(86) PCT No.: PCT/SG2008/000174
§ 371 (c)(1), (2), (4) Date: Mar. 15, 2010

(87) PCT Pub. No.: WO2008/143591
PCT Pub. Date: Nov. 27, 2008

(65) Prior Publication Data

US 2010/0189953 A1 Jul. 29, 2010

(30) Foreign Application Priority Data

May 18, 2007 (SG) ................................ 200703691-6

(51) Int. Cl.
*E04F 17/00* (2006.01)
*E04B 1/70* (2006.01)
*B29C 67/24* (2006.01)
*B32B 3/26* (2006.01)
*E04D 3/35* (2006.01)

(52) U.S. Cl.
USPC .......... 52/302.1; 52/309.4; 264/273; 428/119

(58) Field of Classification Search ................. 52/302.1, 52/302.3, 302.4, 309.4, 309.6, 309.8, 309.9, 52/309.12, 309.17; 428/105, 119, 138, 140, 428/166; 264/273
See application file for complete search history.

(56) References Cited

U.S. PATENT DOCUMENTS

| | | | | | |
|---|---|---|---|---|---|
| 3,288,998 | A | * | 11/1966 | Press, Jr. | 250/336.1 |
| 3,387,420 | A | * | 6/1968 | Long | 52/302.3 |
| 3,412,513 | A | * | 11/1968 | Gosele | 52/144 |
| 4,206,267 | A | * | 6/1980 | Jungbluth | 428/623 |
| 4,449,336 | A | * | 5/1984 | Kelly | 52/105 |
| 4,658,554 | A | * | 4/1987 | Riley et al. | 52/309.8 |
| 4,674,249 | A | * | 6/1987 | Bennett, Jr. | 52/302.3 |
| 4,677,800 | A | * | 7/1987 | Roodvoets | 52/309.12 |
| 4,835,034 | A | * | 5/1989 | Cruz | 428/131 |
| 4,937,990 | A | * | 7/1990 | Paquette | 52/199 |
| 5,088,259 | A | * | 2/1992 | Myers | 52/410 |
| 5,104,715 | A | * | 4/1992 | Cruz | 428/131 |

(Continued)

FOREIGN PATENT DOCUMENTS

| | | | |
|---|---|---|---|
| EP | 0410528 | A1 | 1/1991 |
| EP | 1111146 | A2 | 6/2001 |

(Continued)

*Primary Examiner* — Basil Katcheves
*Assistant Examiner* — Rodney Mintz
(74) *Attorney, Agent, or Firm* — Occhiuti Rohlicek & Tsao LLP

(57) ABSTRACT

This invention relates to a composite panel for a rooftop surface having a core material board having a top surface and a bottom surface with a plurality of openings through said core material board extending from said top surface to said bottom surface; a rigid outer shell of solid material that encapsulates said core material board; a plurality of supports of said solid material wherein each of said plurality of supports extends through one of said plurality of openings in said core material board; and a plurality of legs on a portion of said rigid outer shell covering said bottom surface of core board material.

17 Claims, 7 Drawing Sheets

U.S. PATENT DOCUMENTS

| | | | | | |
|---|---|---|---|---|---|
| 5,369,926 | A | * | 12/1994 | Borland | 52/302.1 |
| 5,377,468 | A | | 1/1995 | Repasky | |
| 5,473,847 | A | * | 12/1995 | Crookston | 52/302.1 |
| 5,561,958 | A | * | 10/1996 | Clement et al. | 52/407.1 |
| 5,699,643 | A | * | 12/1997 | Kinard | 52/742.14 |
| 5,775,039 | A | * | 7/1998 | McPherson | 52/169.5 |
| 5,884,446 | A | * | 3/1999 | Hageman | 52/408 |
| 5,887,397 | A | * | 3/1999 | Repasky | 52/302.4 |
| 6,079,166 | A | * | 6/2000 | Mason et al. | 52/198 |
| 6,233,892 | B1 | * | 5/2001 | Tylman | 52/309.12 |
| 6,256,957 | B1 | * | 7/2001 | Kelly | 52/413 |
| 6,298,620 | B1 | * | 10/2001 | Hatzinikolas | 52/302.1 |
| 6,449,915 | B1 | * | 9/2002 | Park | 52/407.1 |
| 6,457,288 | B2 | * | 10/2002 | Zambelli et al. | 52/220.2 |
| 6,487,830 | B2 | | 12/2002 | Robertson | |
| 7,454,876 | B2 | * | 11/2008 | Kelly | 52/746.11 |
| 7,493,733 | B2 | * | 2/2009 | Kelly | 52/409 |
| 7,493,738 | B2 | * | 2/2009 | Bui | 52/783.11 |
| 7,591,114 | B2 | * | 9/2009 | Herron, III | 52/516 |
| 7,658,052 | B2 | * | 2/2010 | Kelly | 52/746.11 |
| 7,770,354 | B2 | * | 8/2010 | Bui | 52/783.11 |
| 7,805,900 | B2 | * | 10/2010 | Kelly | 52/309.2 |
| 7,877,955 | B2 | * | 2/2011 | Kelly | 52/746.11 |
| 8,028,483 | B2 | * | 10/2011 | Carolan | 52/404.1 |
| 2001/0015039 | A1 | * | 8/2001 | Zambelli et al. | 52/220.3 |
| 2002/0028318 | A1 | * | 3/2002 | Clark | 428/178 |
| 2002/0110666 | A1 | * | 8/2002 | McCollough et al. | 428/138 |
| 2004/0137195 | A1 | * | 7/2004 | Stephens, Jr. | 428/119 |
| 2005/0146068 | A1 | * | 7/2005 | Liu | 264/51 |
| 2008/0041004 | A1 | * | 2/2008 | Gibbar et al. | 52/309.12 |
| 2008/0276557 | A1 | * | 11/2008 | Rapaz | 52/302.3 |
| 2009/0007509 | A1 | * | 1/2009 | Jordan et al. | 52/302.1 |
| 2009/0064617 | A1 | * | 3/2009 | Montoya et al. | 52/309.12 |
| 2009/0193738 | A1 | * | 8/2009 | Kortuem et al. | 52/302.1 |
| 2012/0047839 | A1 | * | 3/2012 | Walker | 52/580 |
| 2012/0047844 | A1 | * | 3/2012 | Walker | 52/741.4 |
| 2012/0227343 | A1 | * | 9/2012 | Curtin et al. | 52/309.4 |
| 2012/0285116 | A1 | * | 11/2012 | Walker | 52/741.4 |
| 2012/0324814 | A1 | * | 12/2012 | Amend | 52/302.1 |

FOREIGN PATENT DOCUMENTS

| | | | | |
|---|---|---|---|---|
| GB | 2223520 | A | * | 4/1990 |
| TW | 491317 | | | 6/2002 |
| TW | 493646 | | | 7/2002 |
| WO | 92/07695 | | | 5/1992 |
| WO | WO 2006002451 | A1 | * | 1/2006 |
| WO | WO 2007040461 | A1 | * | 4/2007 |

* cited by examiner

COMPOSITE CEMENT PANEL

TECHNICAL FIELD

The present invention relates to composite cement panel for use in a roof deck or similar structure, and a fabricating method of the cement panel.

BACKGROUND ART

FIG. 1 illustrates a typical construction 100 of a cladding construction system of a concrete roof deck 102. A cement sand base 104 is formed over the roof deck 102, the base 104 being screed to form a slope or slope-to-fall gradient to create a drainage fall into a drain 106 and downpipe 108. A waterproof membrane 110 is laid over the cement sand base 104, interrupted only by downpipe 108, and extending a height 112 of 300 mm (0.98 feet) up the inside surface of walls 114. Where the deck 102 meets some walls 114, the transition of the waterproof membrane from the horizontal surface to the vertical surface may be effected by use of waterproof filler such as poly foam 116. A thermal insulating layer 118 is constructed on top of the membrane 110, the layer 118 comprising extruded polystyrene insulation board of 50 mm (2 inches) thickness. A separation fleece layer 120 overlies the thermal insulating layer 118. Finally an overlying protective screed concrete layer 122 of 75 mm (2.9 inches) thickness is provided, comprising 4.5 m (4.9 yards) by 4.5 m (4.9 yards) panels separated by joints filled with bituminous compound. Plastering 124 is applied to walls 114.

The thermal insulating material 118 reduces heat transfer through the concrete roof deck 102 into the building below. The protective cement screed 122 protects the thermal insulating material 118 and the waterproofing membrane 110, and bears the human traffic on the roof deck. Such a construction 100 is constructed in-situ on site, with an expansion joint provided at regular intervals.

Construction 100 suffers from a range of problems. The expansion joints in concrete screed layer 122 are a weak point in the construction and a source of leaks. Residual water becomes lodged between the thermal insulating material 118 and the waterproofing membrane 110 after rain. When exposed to heat from the sun, the water expands and evaporates, exerting pressure on the thermal insulating material 118 which in turn exerts pressure onto the protective screed concrete 122. Both the protective screed concrete 122 and thermal insulating material 118 will generally crack due to such stress, leading to leakage and/or "sickness" in the construction 100.

A further problem is that on site cladding construction makes quality control difficult, can cause damage to the waterproofing system, and is subject to the vagaries of inclement weather during construction leading to time delay. In addition, mixing, handling and/or applying concrete slurry on site can be messy and laborious.

Still further, in the event that maintenance is required to the underlying roof deck 102, waterproofing membrane 110 and/or components of the built-up waterproofing system 104, 118, 120, 122, the protective screed 122 and some or all underlying layers need to be destructively removed such as by being cut away, effectively destroying the construction 100. The entire process of building up the waterproofing system must then be repeated to re-establish a waterproof cladding.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DETAILED DESCRIPTION OF THE INVENTION

Throughout this specification, SI units are followed by corresponding English units. Where a discrepancy exists, the SI units control.

Figure 1:
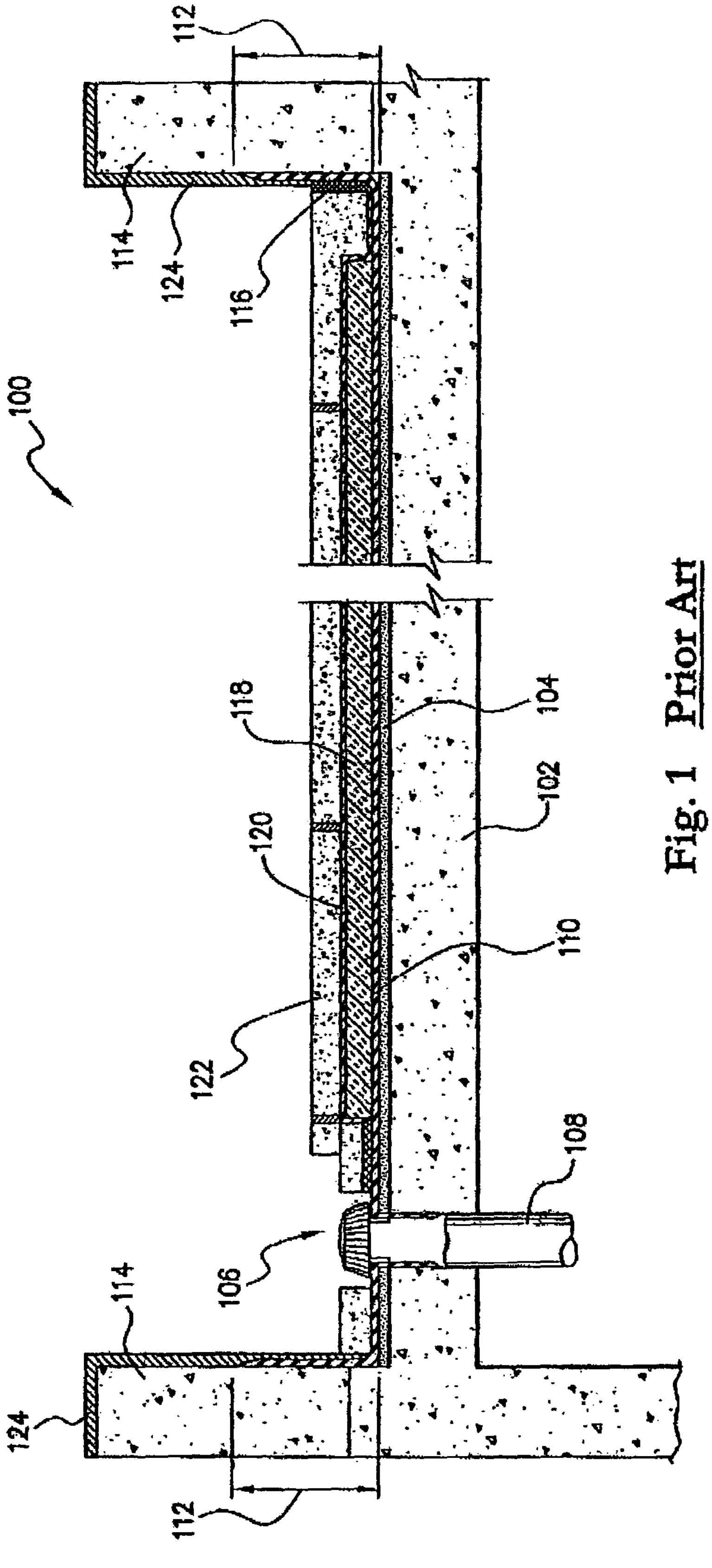
Fig. 1 Prior Art
FIG. 1 illustrates a typical roof cladding construction.
Figure 2:
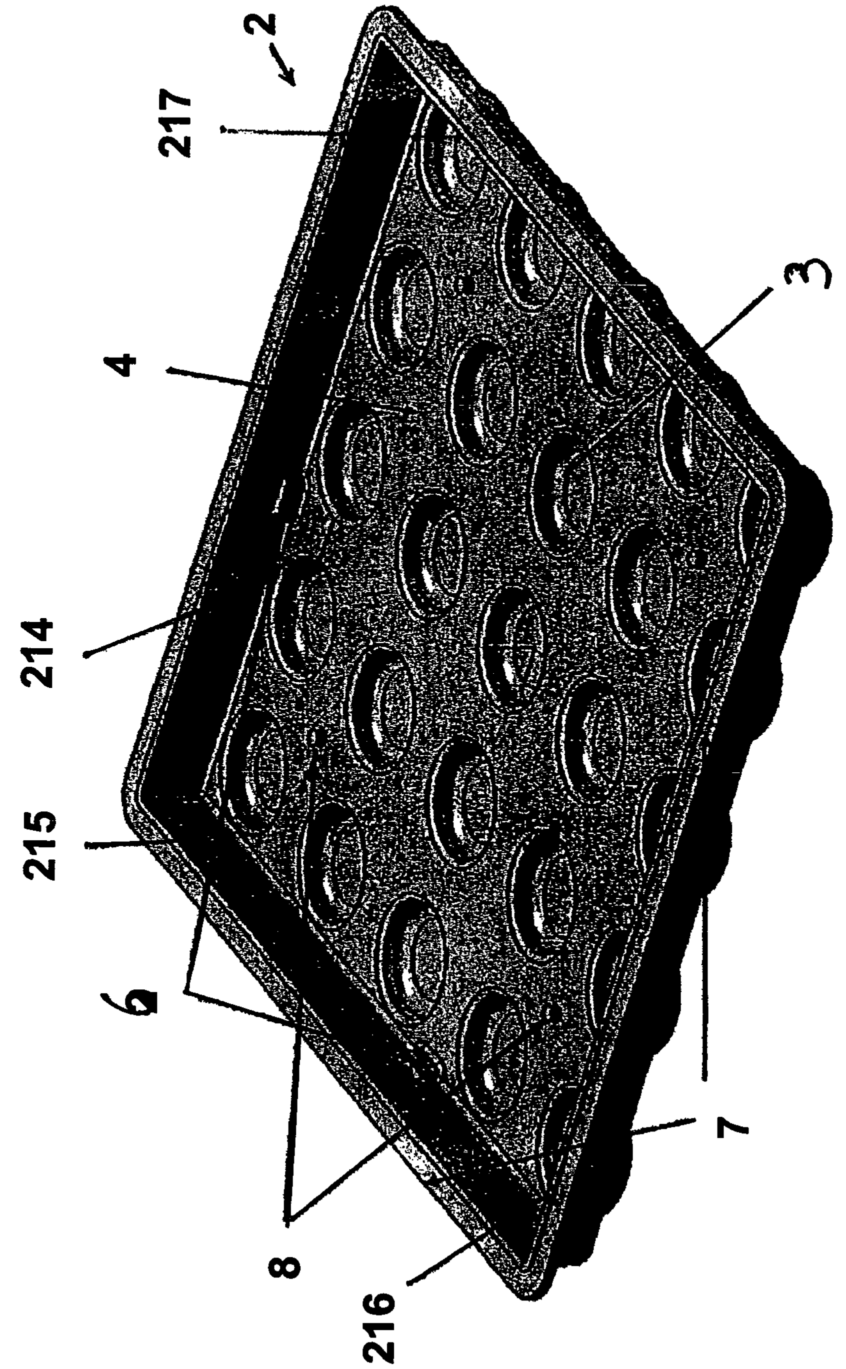
FIG. 2 is a perspective view of a formwork for cement casting for a composite cement panel according to one embodiment of the present invention.
Figure 7A:
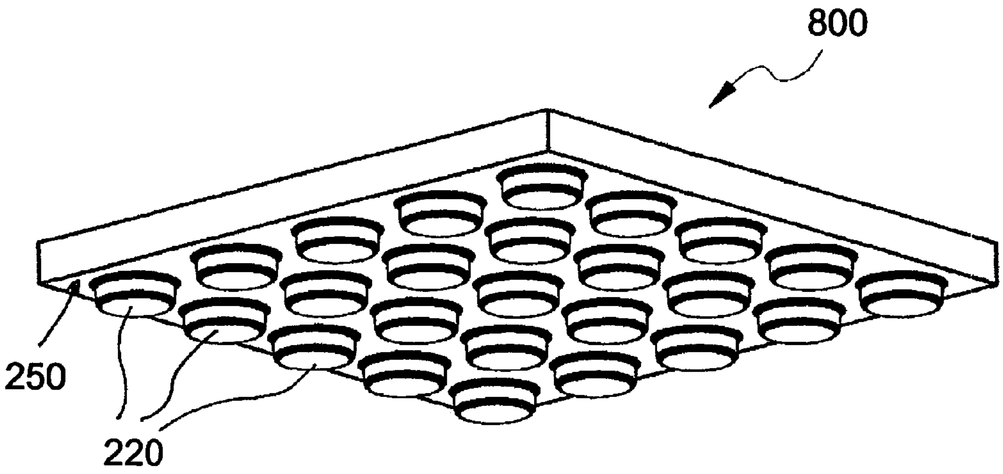
FIG. 7A is a perspective bottom view of FIG. 5A.

FIG. 2 shows a formwork 2, made of metal for example, for casting a composite cement panel 800 shown in FIG. 7A. Formwork 2 has an array of recesses 3 formed on the base surface 4. Recesses 3 are positioned spaced apart from each other across the base surface 4 of the formwork 2. Guide abutments 6 are provided on two adjacent inner surfaces 214, 215 of the metal formwork 2. Formwork 2 further includes pins 8 positioned on the bottom surface 4. Pins 8 extend upwardly from the base surface 4 of formwork 2. Formwork 2 ends with an upturn skirting 7 along the peripheral edge, allowing ease of handling the formwork 2 during casting or transportation of the cement panel 800.

Figure 3:
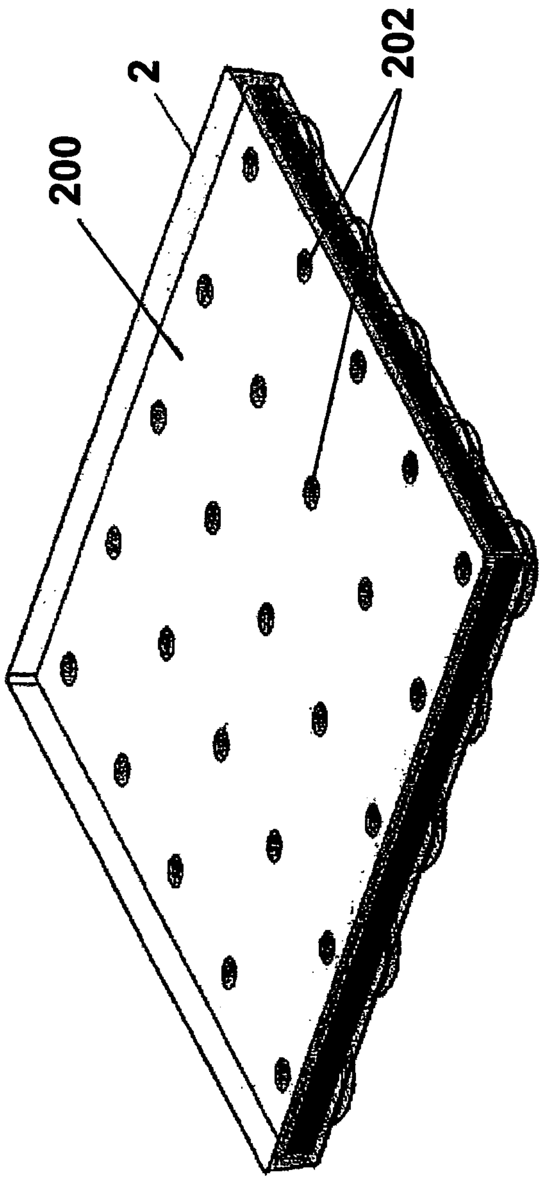
FIG. 3 is a perspective view of a foam board placed in the formwork of FIG. 2 for fabricating a composite cement panel according to one embodiment of the present invention.

FIG. 3 illustrates a light-weight core material board, such as a foam board 200, placed in formwork 2 before the process of cement casting of the composite cement panel 800. Foam board 200 has through holes 202 formed thereon by, for example, drilling, stamping, cutting, punching or pre-made integratedly during a molding process forming the foam board. Through holes 202 are configured such that, when foam board 200 is placed in formwork 2, each through hole faces one recess of formwork 2. When placed in formwork 2, foam board 200 sits on pins 8, leaving a gap between foam board 2 and bottom surface 4 of formwork 2.

Figure 4:
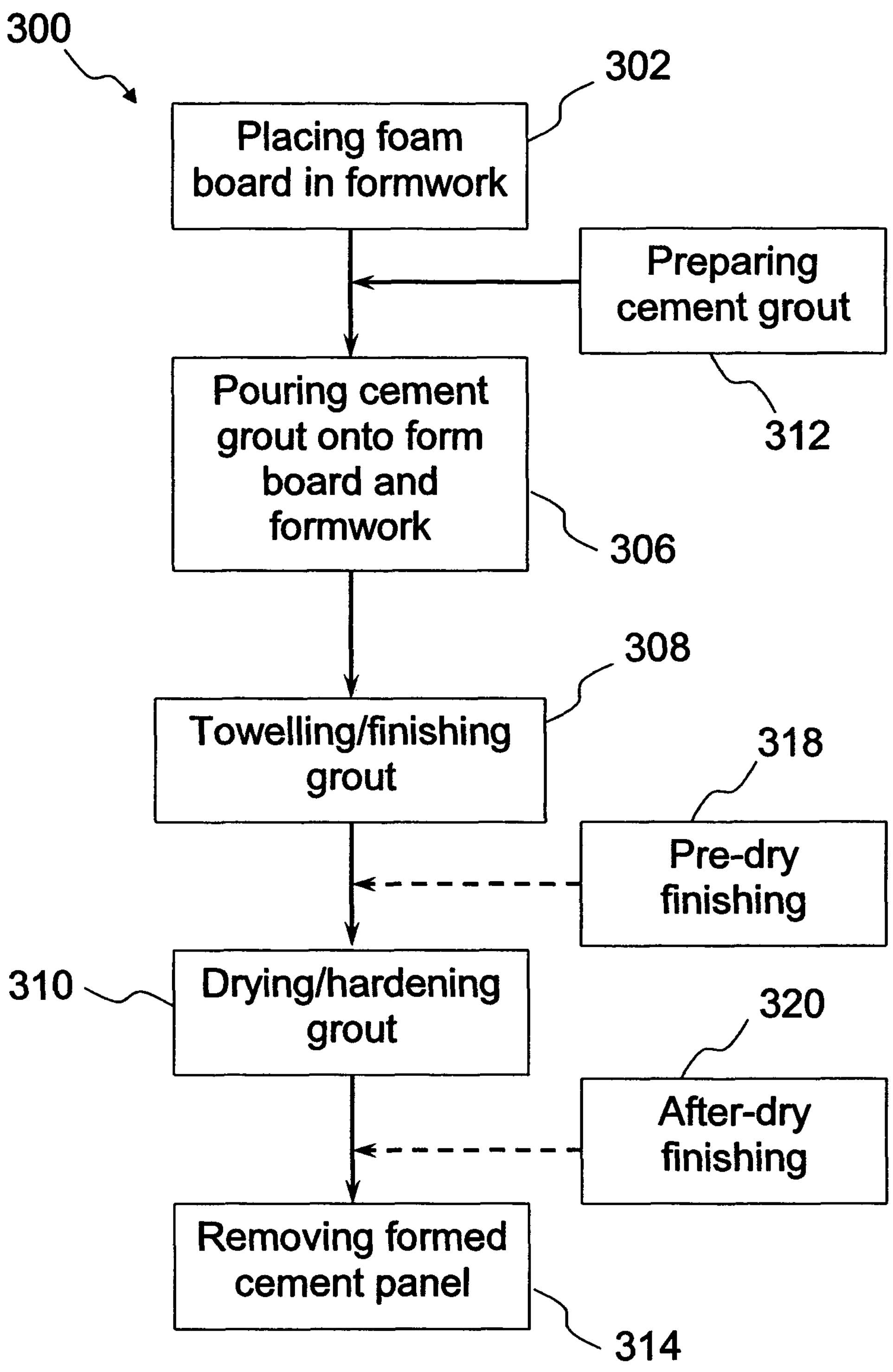
FIG. 4 is a flowchart showing a process for fabricating a cement panel using the formwork of FIG. 2.
Figure 5A:
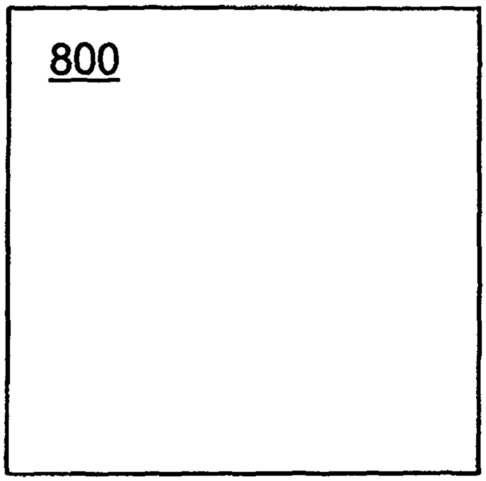
FIG. 5A is a top view of a composite cement panel according to one embodiment of the present invention.

FIG. 4 is a flowchart of a process 300 for fabricating a cement panel using the formwork 2 shown in FIG. 2. At step 302, foam board 200 having through holes 2 formed there on, is placed in the formwork 2, with two adjacent sides of the form board acting against a respective guide abutment 6. This way, there is remained a side gap between the periphery of foam board and inner surfaces 214 and 215 of formwork 2.

At step 312 a pre-mixed self-levelling high strength cement grout, with or without concrete hardener or chemical additive, is prepared. At step 306, the cement grout is poured onto foam board 200 and into formwork 2. During this step, cement grout will fill up the round recesses 3 in the formwork 2, the gap between the foam board and the bottom surface 4 of formwork 2, the gap between the periphery of foam board 200 and inner surfaces 214, 215, 216 and 217 of formwork 2, and the holes 202 of the foam board 200. At step 308, the cement grout fills formwork fully, and is trowelled and finished. At step 310 the cement grout is left to dry and harden, hence to form a cement casing 502 encapsulating foam board 200, and form the composite cement panel. At step 314 the formed cement panel is removed from the formwork 2.

Depending on the building roof conditions and the finishing requirements, the composite cement panel may be fabricated with a suitable finishing layer on its top surface. For example, at an optional pre-dry finishing step 318, pebbles may be poured onto the top surface of the wet composite cement panel. The pebbles are then attached onto the top surface of the panel, and dried together with the panel. Alternatively, color cement powders may be supplied onto the top surface of the wet composite cement panel and dried together, so as to form a colored finishing layer. Imprints with predetermined patterns may also be formed, by molding or pressing the patterns on the top surface of the composite cement panel. In a further optional after-dry step 320, as an alternative of step 318, the dried composite cement panel may be covered by tiles, wood panels or natural/artificial stones and/or a layer of heat-insulating or waterproof coating.

Figure 6A:
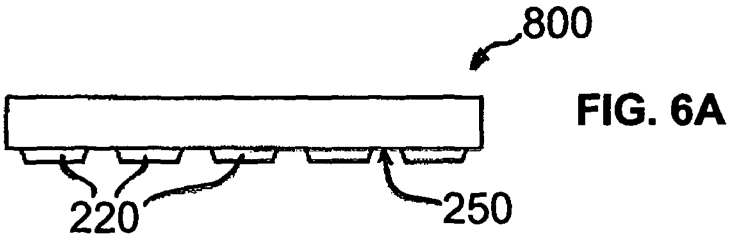
FIG. 6A is a front view of FIG. 5A.
Figure 5B:
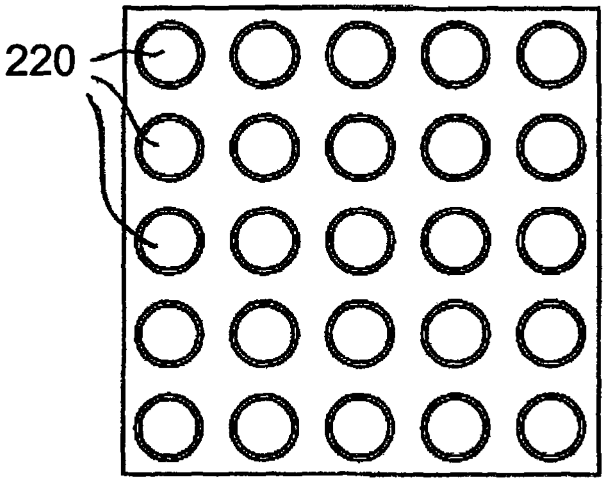
FIG. 5B is a bottom view of FIG. 5A.
Figure 6B:
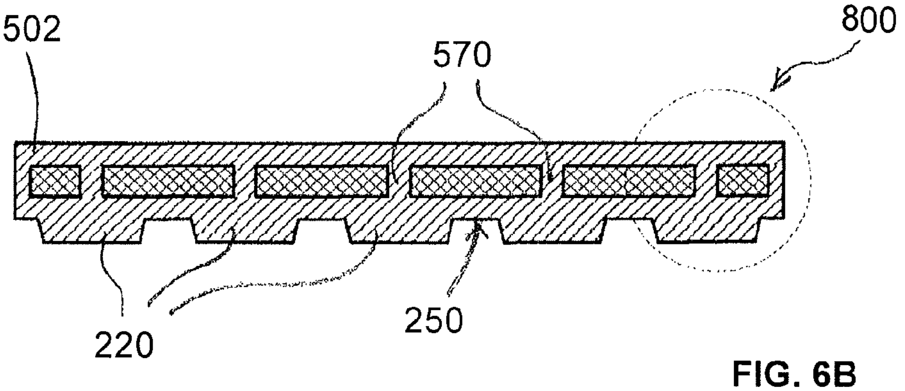
FIG. 6B is a cross sectional side view of FIG. 5A.
Figure 6C:
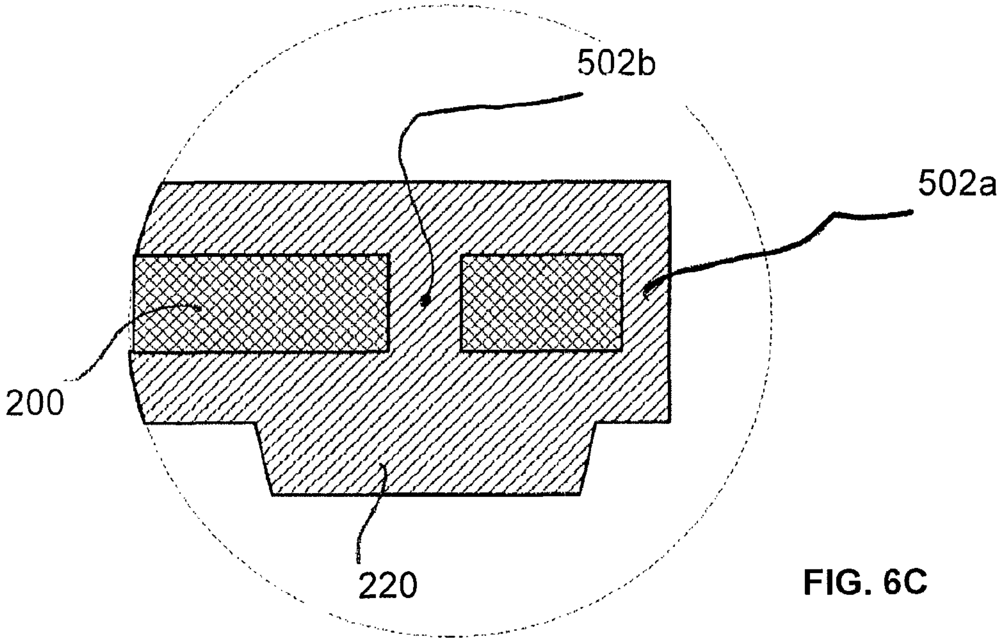
FIG. 6C is a partially enlarges view of FIG. 6B.

FIGS. 5A, 5B, 6A, 6B, 6C, 7A and 7B illustrate a composite cement panel 800 produced after step 314 of process 300 (shown in FIG. 4). With reference to FIG. 6A and FIG. 6B, it can be seen that the foam board 200 is encapsulated in the cement casing 502. Also, it can be seen from FIG. 6C that the top portion and bottom portion of the cement casing is bound by portions of cement 502*a* surrounding the foam board 200 as well as the portions 502*b* filling the holes 202 of the foam board 200. Portions of cement casing 502 fills in the holes 202 of foam board 200, forming columns 570. These columns 570 increase the strength and rigidity of the cement panel 800, and serve to distribute applied weight, such as foot traffic, to reduce the likelihood of foam board 200 being crushed. Portions of the cement casing filling in the round recess 3 of formwork 2 form legs 220 at the bottom side 250 of the composite cement panel 800. Additionally, the foam board 200 is chemically bonded to the cement casing 502 by additives in the cement grout.

Figure 7B:
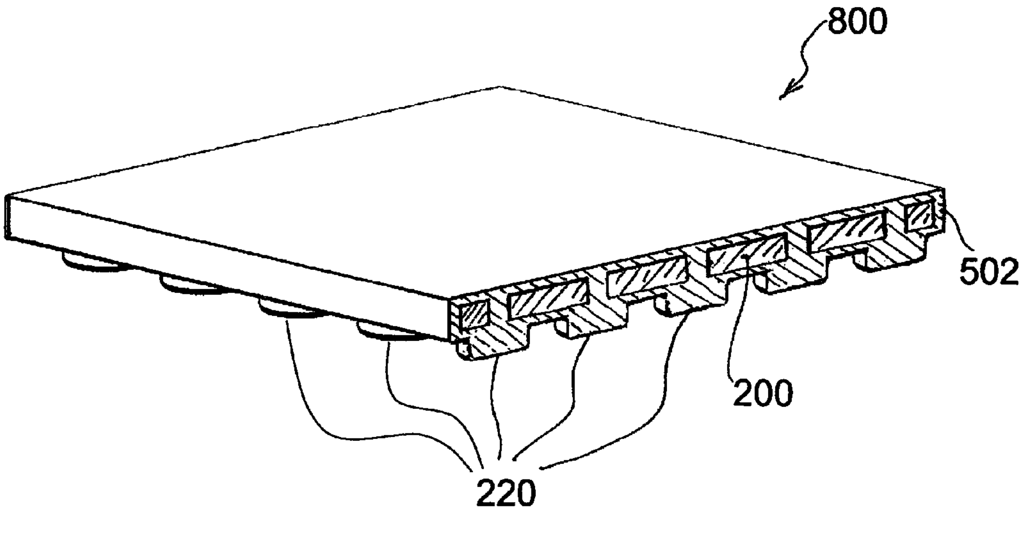
FIG. 7B is a partially cross sectional perspective view of FIG. 5A.

With reference to FIGS. 7A and 7B, legs 220 extend downwardly from the bottom surface 250 of the cement panel 800. When leveled on top the roof top surface of a building, legs 220 rests on the roof top surface, providing a network of multi-directional free-flow paths between the spaces of the legs 220 for draining water along the underside of the cement panel 800. Provision of legs 220 of cylinder shape and multi-directional flow paths reduces trapping of residual water in the cement panel 800, and at the same time allows the water to flow in multiple-directions on the roof top surface level. Thus, better drainage of water can be achieved even in heavy rainfall. By encapsulating the foam board in the cement casing, water or moisture is prevented from penetrating into the panel and wet the foam board, hence the likelihood of the foam board deformation or damage caused by water or moisture content is avoided.

The size and thicknesses of foam boards 200 are kept in appropriate ratio to the size and thickness of the finished cement panel 800 to achieve a satisfactory effect of thermal insulating. In one embodiment, the dimensions of foam board 200 are 18 mm (0.7 inches) thick by 480 mm (18.9 inches) width by 480 mm (18.9 inches) length. Specifications of the one exemplary polystyrene foam board 200 are listed in Table 1 below.

TABLE 1

Specification of foam board

| Property | Test Method | Unit(s) | Typical Value(s) |
|---|---|---|---|
| Density | | kg/m$^3$ | 40-50 (2.5-3.1 lb/ft$^3$) |
| Thermal Conductivity | ASTM C518: 1991 | W/m/° K. kcal/mm/° K. | 0.02207 0.01897 (0.012 BTU/ft/hour/ft$^2$/° F. |
| 10% Compressive Strength (Average) | ASTM D 1621: 2000 | N/mm$^2$ | 0.30 (144.5 psi) |
| Flammability Classification (Average burning rate) | ASTM C635: 91 | % | 10.0 (3.94 inches/minute) |
| Water Absorption (Average) | ASTM C272: 2001 | | 0.01 |
| Temperature of Hot Surface | | ° C. | 40.77 (105.39° F.) |
| Temperature of Cold Surface | | ° C. | 19.95 (67.91° F.) |
| Mean Temperature | | ° C. | 30.36 (86.65° F.) |

The composition of an exemplary pre-mixed, self-leveling, high strength cement grout is listed in Table 2 below.

TABLE 2

Composition of cement grout

| Name | CAS | Proportion |
|---|---|---|
| Portland Cement | 65997-15-1 | 10-60% |
| Sand (Crystalline Quartz) | 14808-60-7 | 10-60% |
| Flow Aid, Plasticiser | | 0-1% |
| Concrete Strengthener Additive | | 250 ml (15.26 in$^3$) |

The specification of an exemplary concrete strengthener is listed in Table 3 below.

TABLE 3 specification of the concrete strengthener

| Property | Unit | Typical Value |
|---|---|---|
| Solid Content | % | >40 |
| Density | kg/m$^3$ | 1.16 ± 0.04 (1.15 ± 0.04 oz/ft$^3$) |
| Crack Filing | mm | 0.1-2 (3.9-78 mil) |
| Depth of Absorption (for Grade 20 Concrete) | mm | 1-8 (39-314 mil) |
| Flash Point Waterborne | | Not flammable |
| Drying Time | hours | 1-3 |
| Weather Condition | ° C. | 10-50 (50-122° F.) |
| UV Resistance | | Stable |

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A composite panel for a rooftop surface, said composite panel comprising: a core material board having a top surface and a bottom surface with a plurality of openings through said core material board extending from said top surface to said bottom surface; a rigid outer shell of solid material that encapsulates said core material board; a plurality of supports of said solid material, wherein each of said plurality of supports extends through one of said plurality of openings in said core material board; a plurality of legs on a portion of said rigid outer shell covering said bottom surface; said plurality of legs supporting said composite panel over a surface of a structure defining a gap between said surface of said structure and a portion of said rigid outer shell over said bottom surface of said core material board; and wherein said plurality of legs define a network of multi-directional flow paths under said composite panel in said gap defined by said plurality of legs, wherein each of said flow paths directs a flow of material in a different direction, said network of flow paths including at least a first flow path and a second flow path, wherein said first flow path and said second flow path are in different directions, wherein each of said legs is cylinder shaped, and wherein each of said supports is substantially aligned with one of said legs.

2. The composite panel of claim 1, wherein said supports are integral to said rigid outer shell.

3. The composite panel of claim 1, wherein each of said supports is a column.

4. The composite panel of claim 1, wherein said core material board is chemically bonded to said rigid outer shell.

5. The composite panel of claim 1, wherein said core material board comprises a polystyrene foam board.

6. The composite panel of claim 1, wherein said rigid outer shell comprises a cement mixture.

7. The composite panel of claim 1, further comprising: a covering over a surface of a portion of said rigid outer shell covering said top surface of said core material board.

8. A method for producing a composite panel comprising: placing-a core material board having a top surface, a bottom surface, and a plurality of openings through said core material board from said top surface to said bottom surface-in a formwork having a base surface with a plurality of recesses defined in said base surface, a rigid outer shell of solid material that encapsulates said core material board, a plurality of supports of said solid material, wherein each of said plurality of supports extends through one of said plurality of openings in said core material board, a plurality of legs on a portion of said rigid outer shell covering said bottom surface, said plurality of legs supporting said composite panel over a surface of a structure defining a gap between said surface of said structure and a portion of said rigid outer shell over said bottom surface of said core material board, and wherein said plurality of legs define a network of multi-directional flow paths under said composite panel in said gap defined by said plurality of legs, wherein each of said flow paths directs a flow of material in a different direction, said network of flow paths including at least a first flow path and a second flow path, wherein said first flow path and said second flow path are in different directions, wherein each of said legs is cylinder shaped, and wherein each of said supports is substantially aligned with one of said legs, filling said formwork with a viscous material that fills said plurality of recesses, fills said plurality of openings in said core material board and surrounds said core material board in said formwork; and allowing said viscous material to harden into a rigid outer shell encapsulating said core material board.

9. The method of claim 8 further comprising: trowelling a top surface of said viscous material to create a smooth surface responsive to pouring said viscous material into said formwork.

10. The method of claim 8 further comprising: pouring pebbles onto a surface of said viscous material after pouring said viscous material into said formwork.

11. The method of claim 8 further comprising: pouring a colored powder onto a top surface of said viscous material after pouring said viscous material into said formwork.

12. The method of claim 8 further comprising: covering a top surface of said rigid outer shell with a material after hardening said viscous material into said rigid outer shell.

13. The method of claim 8 further comprising: removing said composite panel from said formwork after said viscous material has hardened into said rigid outer shell.

14. The method of claim 8 wherein said core material board is made of polystyrene foam.

15. The method of claim 8 further comprising: aligning each of plurality of openings through said core material board with one of said plurality of recesses in said formwork.

16. The method of claim 8 wherein said viscous material is a cement mixture.

17. The method of claim 16 further comprising: preparing said cement mixture prior to pouring said cement mixture into said formwork.

* * * * *